June 11, 1935. K. MIDDELBOE 2,004,381
MANUFACTURE OF HYDRAULIC CEMENT AND THE LIKE
Filed Jan. 27, 1934 4 Sheets-Sheet 1

INVENTOR
Kristian Middelboe
BY
Redding, Greeley, O'Shea & Campbell
ATTORNEYS

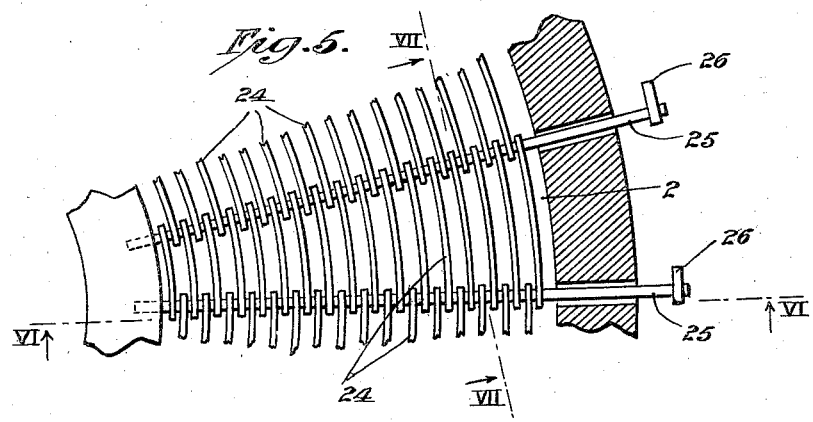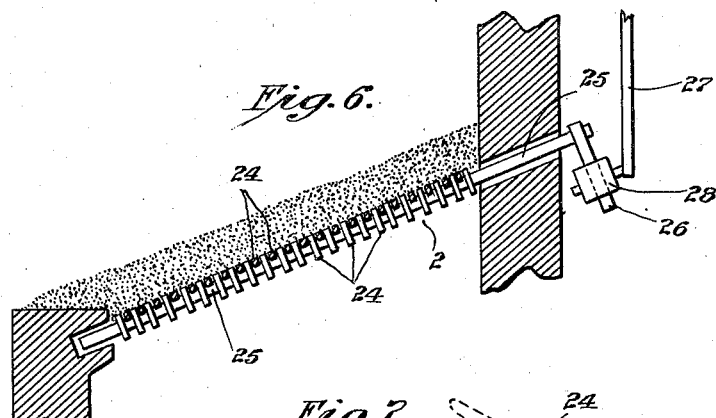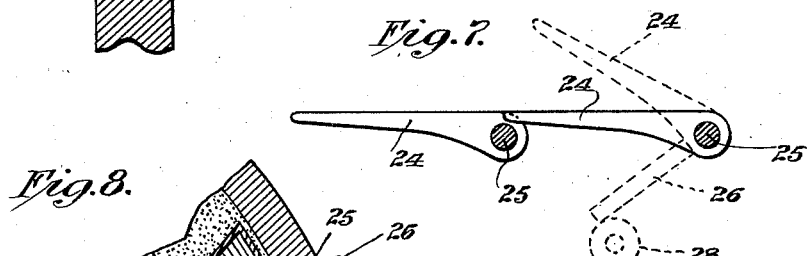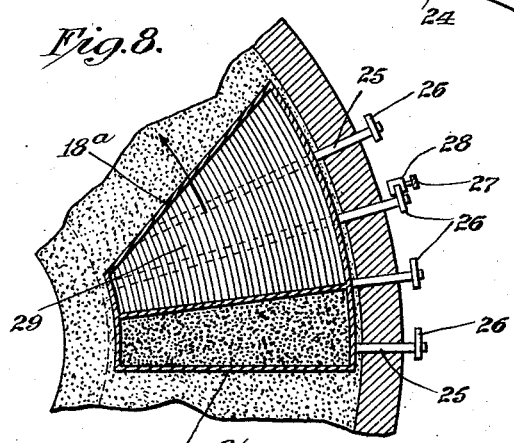

June 11, 1935.  K. MIDDELBOE  2,004,381
MANUFACTURE OF HYDRAULIC CEMENT AND THE LIKE
Filed Jan. 27, 1934  4 Sheets-Sheet 4
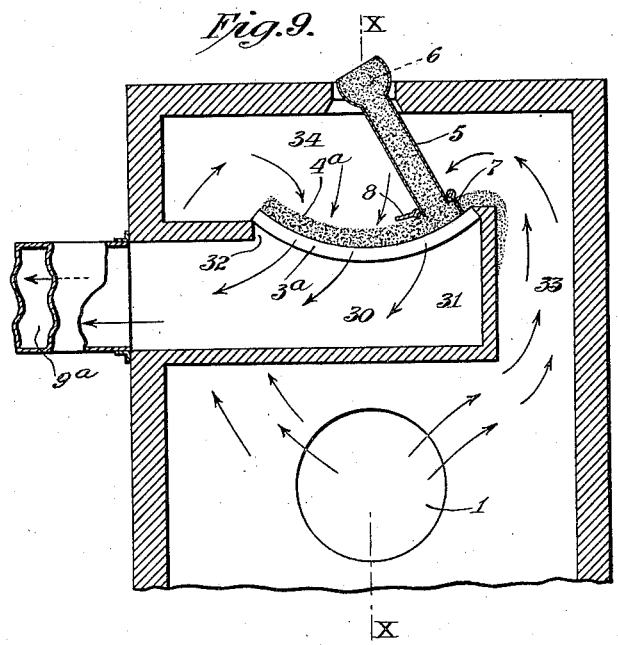
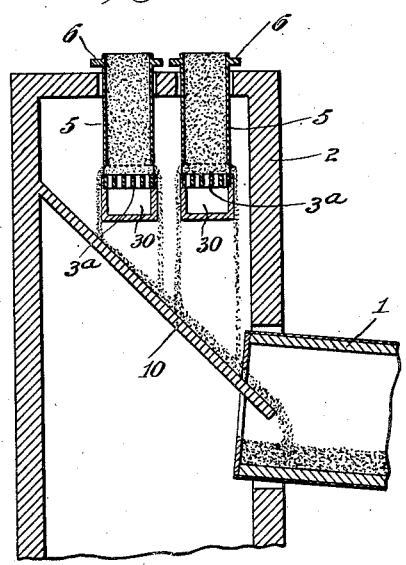
INVENTOR
Kristian Middelboe
BY
Redding Greeley, O'Shea & Campbell
ATTORNEYS Patented June 11, 1935

2,004,381

UNITED STATES PATENT OFFICE 2,004,381

MANUFACTURE OF HYDRAULIC CEMENT AND THE LIKE

Kristian Middelboe, Frederiksberg, near Copenhagen, Denmark, assignor to F. L. Smidth & Co., New York, N. Y., a corporation of New Jersey Application January 27, 1934, Serial No. 708,578
In Great Britain January 30, 1933

11 Claims. (Cl. 34—23)

This invention has for its object to improve apparatus such as is commonly used in the manufacture of hydraulic cement in effecting a change of temperature of cement material, as in preheating by the hot waste gases of a cement kiln the cement raw material preliminary to its delivery to the kiln for calcination and clinkering, or in the cooling, by atmospheric air, of the clinker as it is delivered from the kiln. It has been usual heretofore, in the preheating of cement raw material, to superimpose the material as a layer upon a gas-permeable support, such, for example, as an endless chain grate, by which the material, as it is heated by the passage of hot gases through the support and through the layer of material thereon and, in the cooling of clinker, to deliver the clinker from the kiln into cooling drums in which the clinker, while moving longitudinally in the drums, is cascaded through the current of cooling air. In the preheating of raw material on a traveling, gas-permeable support, such as an endless chain grate, there is, in greater or less degree, a breaking up of the nodules or small pieces of material, purposely prepared in such form for the better attainment of desired results in the burning of the material in the kiln, with the result that the material is introduced into the kiln in less desirable form and that there is a loss of a substantial part of the material in the form of dust, which may pass through the gas permeable conveyor or may be carried off on the current of hot gases. Moreover, such apparatus does not lend itself readily to the formation of an efficient seal between the movable and the stationary parts of the apparatus. The hot clinker, cooled in cooling drums, is less subject to disintegration than are the nodules of raw material preheated on a traveling conveyor, but the disintegrating action to which the clinker is subjected in the cooling drums is much more severe and there results a considerable formation of dust, which is undesirable, and in this case also there is difficulty in obtaining an efficient seal where a seal is desirable. In accordance with the present invention the material which is to be changed in temperature, whether the cement raw material to be preheated or the cement clinker to be cooled, is deposited in a layer upon a stationary, gas-permeable support and the temperature changing medium, whether it be the hot gases from the kiln or atmospheric air, is caused to pass through the layer of the material which after the heating or the cooling, as the case may be, is discharged from the stationary, gas-permeable support and is conducted to the kiln or to the pulverizer, as the case may be. The material is delivered to the gas-permeable support by a moving feed device and is discharged therefrom by a moving device in advance of the feeding device. The invention will be more fully explained hereinafter with reference to the accompanying drawings in which it is illustrated, and in which—

Figures 5, 6, 7 and 8 are detail views representing in plan in Figure 5, in section on the plane indicated by the broken line VI—VI of Figure 5, in section on the plane indicated by the broken line VII—VII of Figure 5, and in partial plan view on a smaller scale, respectively, a different embodiment of the invention.

Figures 9 and 10 are detail views in section illustrating another embodiment of the invention, the plane of section of Figure 10 being indicated by the broken line X—X of Figure 9.

Figure 1:
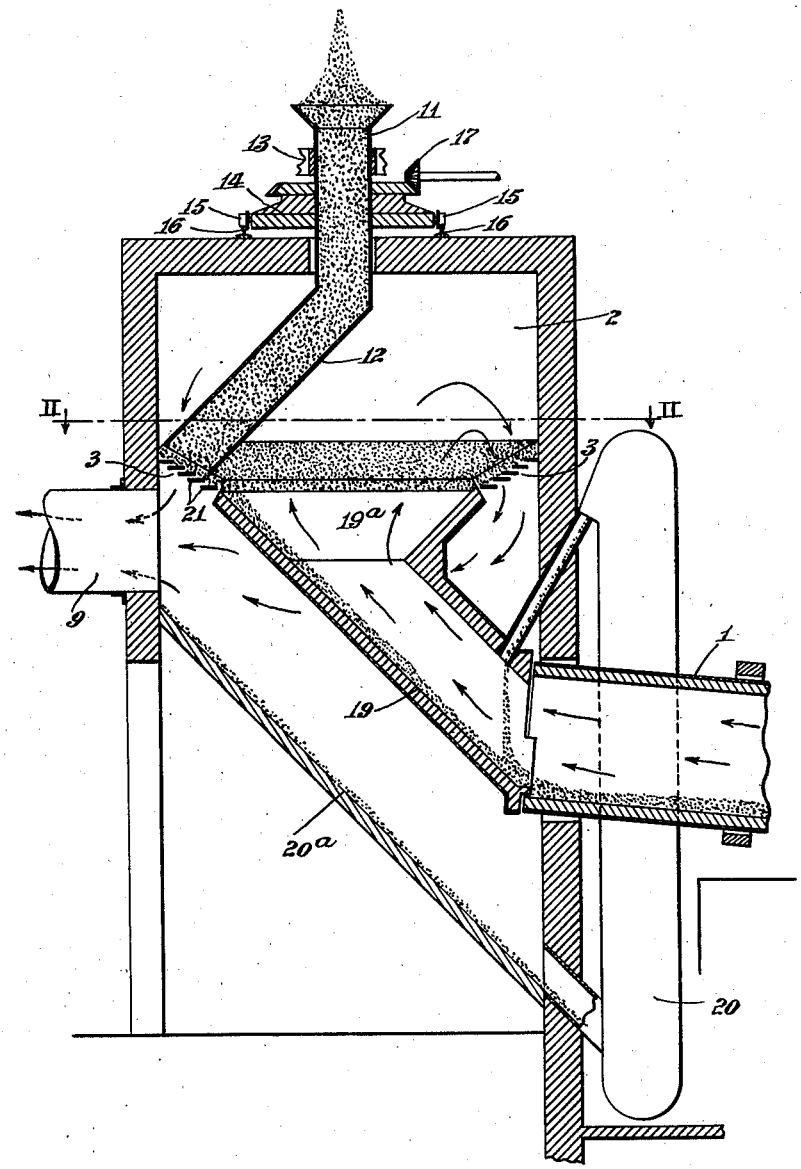
Figure 1 is a view in sectional elevation of an apparatus which embodies the invention, the same being designed particularly for use in the preheating of cement raw material on its way to the kiln.
Figure 2:
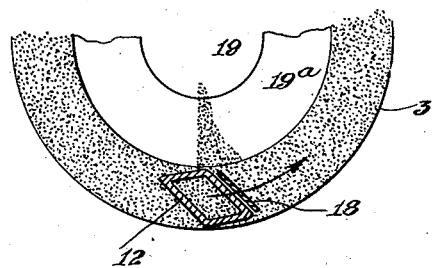
Figure 2 is a partial view in horizontal section on the plane indicated by the broken line II—II of Figure 1.
Figure 3:
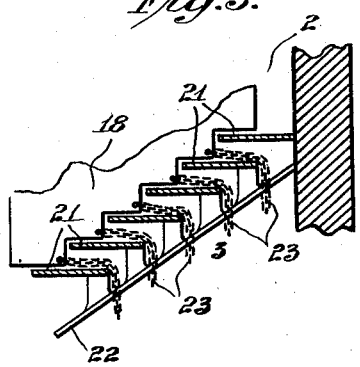
Figure 3 is a detail view partly in outline illustrating, in section and on a larger scale, the construction of the gas-permeable support shown in Figure 1.
Figure 4:
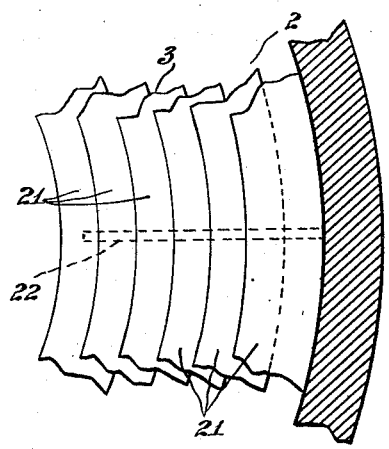
Figure 4 is a detail view, partly in horizontal section and partly as seen from above, of the structure shown in Figure 3.

In the embodiment of the invention illustrated in Figure 1 the hot gases are discharged from a rotary kiln 1 through a conduit formed by a chute 19 into a chamber 2 from which they pass to the stack through a conduit 9. The gases pass upward through the central opening of an annular, truncated conical grate 3 and then pass downwardly through the grate 3 on their way to the conduit 9. The upper part 19a of the chute 19 is so formed, as shown, as to compel the hot gases to pass upwardly through the central opening of the grate 3 and then downwardly through the grate. The material, in this case assumed to be cement raw material to be preheated, is superimposed upon the stationary gas-permeable grate 3 in the form of a layer of suitable and uniform thickness. The feed device in this instance takes the form of a pipe having a vertical section 11 and an inclined section 12, the discharge end of which conforms to the conical surface of the grate and is spaced therefrom sufficiently to permit the material fed through the pipe to be deposited upon the grate in a uniform layer as the pipe section 11 rotates and the pipe section 12 revolves with it. The feed device is supported by a bearing 13 and a turn-table 14 provided with wheels 15 to run on a circular rail 16. The feed device may be driven by any suitable means, as by bevel gearing indicated at 17. The pipe section 12 preferably has a cross section as indicated in Fig. 2 and is provided at the leading side of its mouth with a scraper 18 facing in the direction of rotation by which the material which has been heated by the passage of the hot gases therethrough is discharged from the grate into the funnel shaped portion 19a and thence through the chute 19 into the kiln. It will be understood that the heated material thus discharged is replaced immediately by a layer of material to be heated. Such of the heated material as may pass over the outer edge of the grate passes through a chute 20a to the foot of an elevator 20, of usual construction, by which it is delivered to the kiln 1 through the chute 19.

The grate 3 may be formed as a stepped grate composed of horizontal circular grate plates 21, supported upon a radial supporting structure 22, the lower edge of the scraper 18 being also stepped to conform to the grate, but having no portion projecting between the plates which might interfere with the proper operation of the apparatus in the event of possible warping of the grate plates. To ensure the discharge of the material between the grate plates the scraper 18 may be provided with short chains 23 which pass through the spaces between the plates and along over the edges of the plates.

In the embodiment of the invention illustrated in Figs. 5–8 the grate is shown as formed of a series of sectors each composed of a radial rocking shaft 25 and grate bars 24 secured thereto. Each shaft 25 is projected outward through the wall of the chamber 2 and is provided with an arm 26, at right angle to the axis of the shaft, for cooperation with a roller 28 connected with the rotary feed mechanism as by an arm 27. In this instance the scraper 18a precedes the feed device 12a by a distance greater than the length of any grate sector so that, in the operation of the apparatus, the grate sectors are free of material during a short space of time in which, through the cooperation of the roller 28 with the arm 26 of the corresponding grate sector, the grate bars of such sector are rocked for the purpose of freeing the grate from material which might be jammed between the grate bars.

In a plant of relatively small capacity it may be desirable to employ a stationary grate of a general character such as that illustrated in Figs. 9 and 10, in which arcuate grate bars 3a are supported so as to receive a layer of material 4a from a feed pipe 5 which is mounted to oscillate upon an axis 6 which coincides with that of the arc on which the arcuate grate bars are formed. This feed pipe, which may be oscillated by any suitable means and to which the material may be supplied continuously, is provided at its discharge end with hinged scrapers 7, 8. In each swing of the feed pipe in one direction or the other the scraper at the leading side of the feed pipe assumes the position shown at 7 in Fig. 9, while the scraper at the trailing side of the feed pipe assumes the position shown at 8. In this manner the material, which has been attempered by the passage of gas or air through it and through the gas-permeable support formed by the arcuate grate bars, is discharged from such support and, as shown in Fig. 10, may fall upon a chute 10 by which the material is directed into the kiln 1, when the apparatus is used for the preheating of the raw material preliminary to its introduction into the kiln. In this construction, in which the kiln is assumed to be the source of the attempering medium, the gas-permeable support tempering medium is so mounted in the chamber 2, between the source 1 and the outlet conduit 9a, that the attempering medium is compelled to pass downward through the layer 4a of material on the grate 3a. To this end the arcuate grate bars 3a are mounted upon a casing 30 formed within the chamber 2 and forming a chamber 31 with an opening as at 32 in which the grate bars 3a are supported, the chamber 31 communicating with the conduit 9a through which the attempering medium, after it has done its work, is led away. A channel 33 between the casing 30 and the wall of the chamber 2 conducts the attempering medium from its source to a chamber 34 above the grate from which the attempering medium passes downward through the material to be attempered and the gas-permeable grate on which it is supported.

It will be understood that while the invention has been explained with particular reference to the heating of cement raw material on its way to the kiln, it is applicable to any industry in which material is to be attempered by the passage of an attempering medium, whether the same be from kiln gases or atmospheric air or any other gaseous attempering medium. It will also be understood that various changes in construction and arrangement may be made to suit different conditions of use and that, except as pointed out in the accompanying claims, the invention is not restricted to the particular constructions and arrangements shown and described herein or any of them.

I claim as my invention:

1. Apparatus for attempering cement material and the like, comprising a housing, a gas-permeable support within the housing, a movable feeding device within the housing to deposit on the support a layer of material to be attempered, and means to direct the attempering medium within the housing through said support and the material thereon, the housing being provided below said support with a conduit for the escape of said medium, and said support being so positioned between said means and said conduit that the medium passes down through the support.

2. Apparatus for attempering cement material and the like, comprising a stationary, annular gas-permeable support, a chute having a funnel shaped top to conduct an attempering medium to and through the central opening of the support and to receive material discharged from the support, a movable feeding device to deposit on the support a layer of material to be attempered, and means movable with the feeding device to discharge the material from the support.

3. Apparatus for attempering cement material and the like, comprising a stationary, annular, gas-permeable support, a chute having a funnel shaped top to conduct an attempering medium to and through the central opening of the support and to receive material discharged from the support, a movable feeding device to deposit on the support a layer of material to be attempered, means movable with the feeding device to discharge the material from the support, and means to direct an attempering medium through the support and the material thereon.

4. Apparatus for attempering cement material and the like, comprising a stationary, annular, gas-permeable support, a chute having a funnel shaped top to conduct an attempering medium to and through the central opening of the support, and to receive material discharged from the support, a movable feeding device to deposit on the support a layer of material to be attempered, means movable with the feeding device to discharge the material from the support, means to direct an attempering medium through the support and the material thereon, a chute to receive material falling over the edge of the support, and means to return such material to the first mentioned chute.

5. Apparatus for attempering cement material and the like, comprising a stationary, annular, gas-permeable support formed of a stepped series of annular plates, a movable feeding device to deposit on the support a layer of material to be attempered, a scraper movable with the feeding device and in advance thereof, the scraper being stepped to conform to the stepped series of spaced plates, chains secured to the scraper and extended through the spaces between the plates, and means to direct an attempering medium through the support and the material thereon.

6. Apparatus for attempering cement material and the like, comprising a chamber, a stationary, gas-permeable support extended across the chamber, a movable feeding device to deposit on the support a layer of material to be attempered, movable means to discharge the material from the support, means to direct an attempering medium upward through the central opening of the support into the chamber above the same, and means to conduct away the attempering medium which passes downward through the support and the material thereon.

7. Apparatus for attempering cement material and the like, comprising a stationary, gas-permeable support, a movable feeding device to deposit on the support a layer of material to be attempered, movable means to discharge the material from the support, and means to direct an attempering medium through the support and the material thereon, said support comprising a series of sectors, each composed of a rocking shaft and grate bars carried thereby.

8. Apparatus for attempering cement material and the like, comprising a stationary, gas-permeable support, a movable feeding device to deposit on the support a layer of material to be attempered, movable means to discharge the material from the support, means to direct an attempering medium through the support and the material thereon, said support comprising a series of sectors, each composed of a rocking shaft and grate bars carried thereby, and means to rock said shafts.

9. Apparatus for attempering cement material and the like, comprising a stationary, gas-permeable support, a movable feeding device to deposit on the support a layer of material to be attempered, movable means to discharge the material from the support, means to direct an attempering medium through the support and the material thereon, said support comprising a series of sectors, each composed of a rocking shaft and grate bars carried thereby, and means to rock said shafts, the means to discharge the material from the support consisting of a scraper carried in advance of the leading side of the feeding device by a distance equal to the length of each of said sectors.

10. Apparatus for attempering cement material and the like, comprising a stationary, gas-permeable support composed of arcuate grate bars, a feeding tube mounted to oscillate upon an axis coincident with the axis of the arc of the grate bars and having its discharge end conformed to the surface of the support to deposit and spread on the support a layer of material to be attempered, and means to direct an attempering medium through the support and the material thereon.

11. Apparatus for attempering cement material and the like, comprising a stationary, gas-permeable support composed of arcuate grate bars, a feeding tube mounted to oscillate upon an axis coincident with the axis of the arc of the grate bars and having its discharge end conformed to the surface of the support to deposit and spread on the support a layer of material to be attempered, and means to direct an attempering medium through the support and the material thereon, the feeding tube having a scraper hinged to each working face thereof.

KRISTIAN MIDDELBOE.